US006948668B2

(12) United States Patent
Mazzer

(10) Patent No.: US 6,948,668 B2
(45) Date of Patent: Sep. 27, 2005

(54) COFFEE GRINDER-DISPENSER

(75) Inventor: Giovanni Mazzer, Scorze' (IT)

(73) Assignee: Mazzer Luigi S.R.L., Scorze (IT)

( * ) Notice: Subject to any disclaimer, the term of this patent is extended or adjusted under 35 U.S.C. 154(b) by 169 days.

(21) Appl. No.: 10/316,909

(22) Filed: Dec. 12, 2002

(65) Prior Publication Data

US 2003/0110953 A1 Jun. 19, 2003

(30) Foreign Application Priority Data

Dec. 19, 2001 (IT) ..................................... VE2001A0055

(51) Int. Cl.[7] ......................... B02C 13/00; B02C 17/02; B02C 23/10; B07B 13/00; B07C 7/00

(52) U.S. Cl. ...................... 241/79; 241/100; 241/186.2; 99/280

(58) Field of Search ....................... 241/79, 100, 186.2; 99/280

(56) References Cited

U.S. PATENT DOCUMENTS 4,624,177 A * 11/1986 Ito et al. ....................... 99/286
4,749,134 A * 6/1988 Van Camp .................. 241/100
5,463,932 A * 11/1995 Olson .......................... 99/280
5,950,941 A * 9/1999 McNeill et al. ............ 241/79.1

* cited by examiner

*Primary Examiner*—Derris H. Banks
*Assistant Examiner*—Jason Pahng
(74) *Attorney, Agent, or Firm*—Hoffman Wasson & Gitler, PC

(57) ABSTRACT

A coffee grinder-dispenser comprising a base, a grinder located within the base, an electric motor for operating the grinder, and a hopper, or cup, for receiving the coffee beans to be ground. A funnel is secured to the base, to receive the ground coffee, or powder via a distribution channel that extends in a horizontal plane. A grid, comprising spaced stainless steel rods, extending vertically and horizontally, is positioned in the entry hole or port of the funnel in alignment with the distribution conduit of the grinder-dispenser. The grid reduces the velocity of the ground coffee, or powder, so that the powder does not accumulate upon, or adhere to, the walls of the funnel. Consequently, when a lever on the base is operated, an accurate amount of ground coffee is discharged from the funnel into a conventional filter holder.

3 Claims, 4 Drawing Sheets

COFFEE GRINDER-DISPENSER

This invention relates to a coffee grinder-dispenser.

BACKGROUND OF THE INVENTION

Coffee grinder-dispensers are known comprising a base structure housing an electric motor which supports a plastic cup member containing the coffee beans and a ground coffee collection container provided with a lever device for dispensing a predetermined weight quantity.

In the operation of this grinder-dispenser the coffee beans are ground by a suitable device operated by the electric motor, the ground coffee fed into the container then being transferred into the filter holder by operating the lever.

A drawback of this known grinder-dispenser consists of the fact that in the case of machines used in premises having a low daily consumption or related to determined hours of the day (such as restaurants), the ground coffee remains in the container for several hours, so degrading and losing its smell, taste and other qualities.

To obviate this drawback, grinder-dispensers have been proposed comprising a funnel-shaped container for conveying the ground coffee to a conventional filter holder in a predetermined quantity.

This known grinder-dispenser, which eliminates the drawback of coffee accumulation in the container, presents however the drawback that because of the volatility of its powder, the coffee often remains adhering to the surface which it encounters during its fall.

The result is that on the one hand the dispensed quantity may be non-constant and less than the predetermined weight, while on the other hand the powder quantity may be more than the predetermined weight because due to successive coffee build-up on the walls, the weight of the powder causes it to separate therefrom.

Another drawback related to the powder volatility consists of an accumulation of dirt in the support region of the filter holder.

BRIEF SUMMARY OF THE INVENTION

An object of this invention is to eliminate these drawbacks by providing a coffee grinder-dispenser which instantaneously grinds the required coffee quantity without presenting reliability problems with regard to its distribution into the filter holder.

This and further objects which will be apparent from the ensuing description are attained according to the invention by a coffee grinder-dispenser configured in accordance with the invention developed by the applicant.

BRIEF DESCRIPTION OF THE DRAWINGS

A preferred embodiment of the invention is described in detail hereinafter with reference to the accompanying drawings, in which.

DETAILED DESCRIPTION

Figure 1:
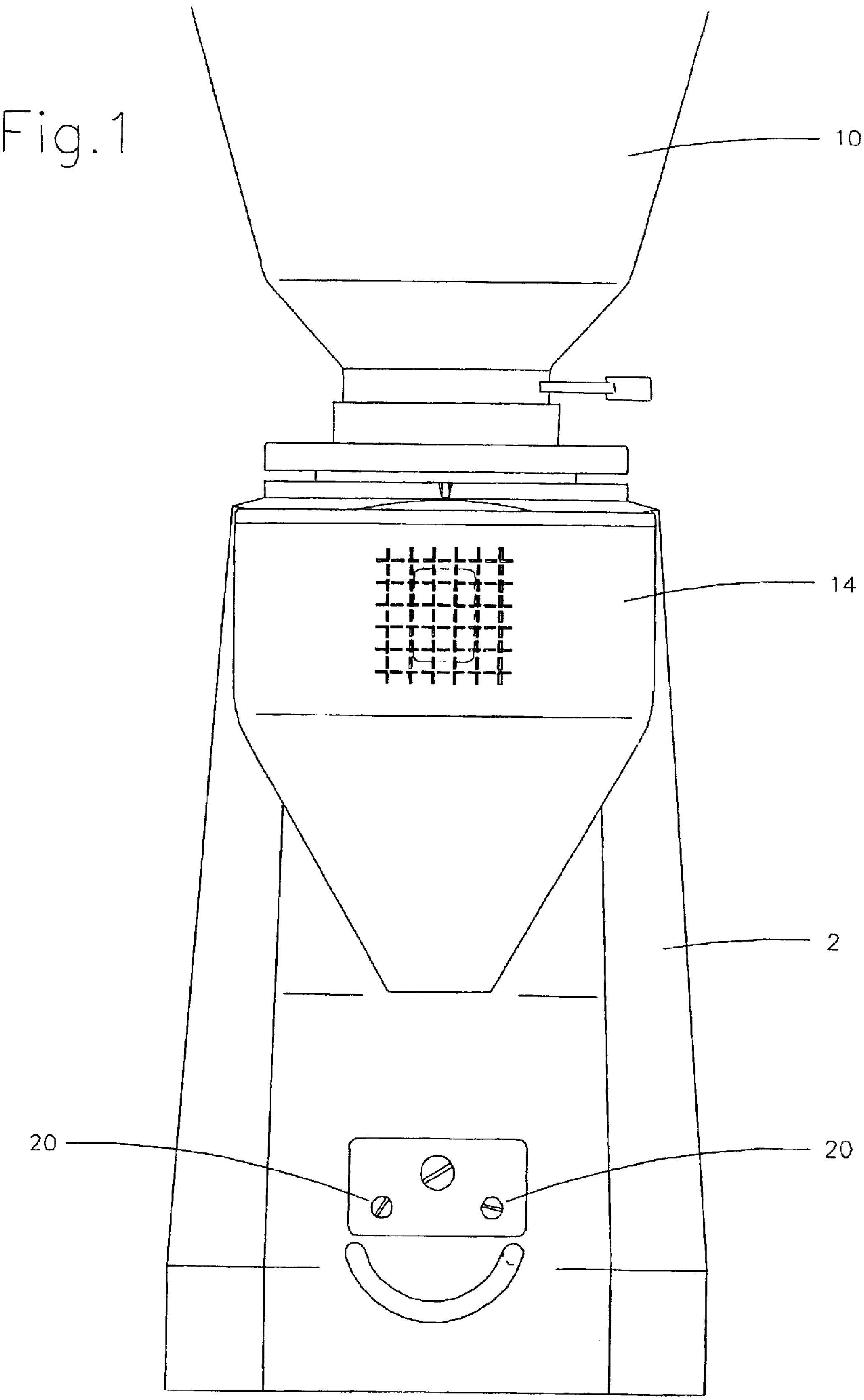
FIG. 1 is a front view of a grinder-dispenser according to the invention.
Figure 2:
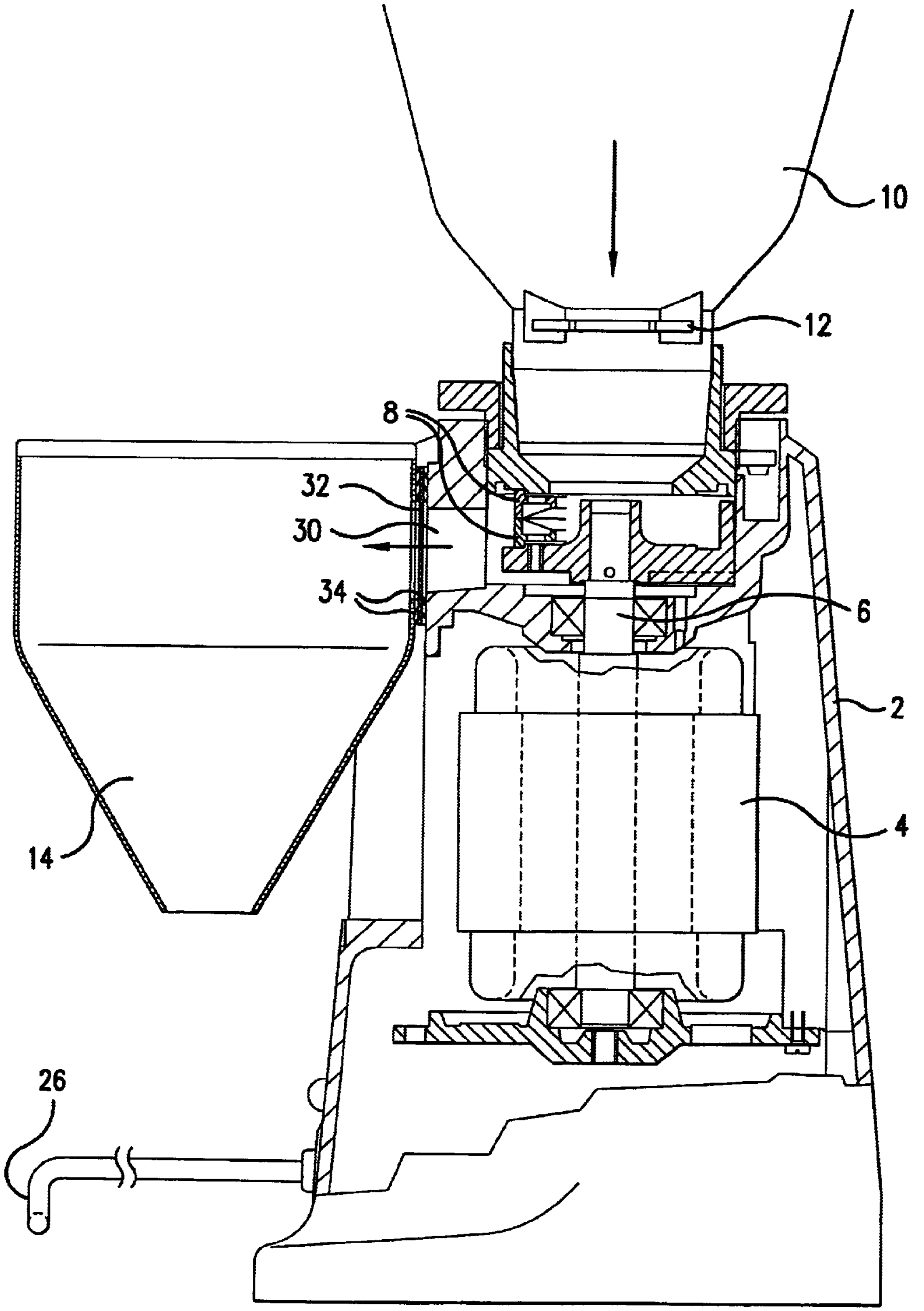
FIG. 2 is a partly sectional side view thereof.
Figure 3:
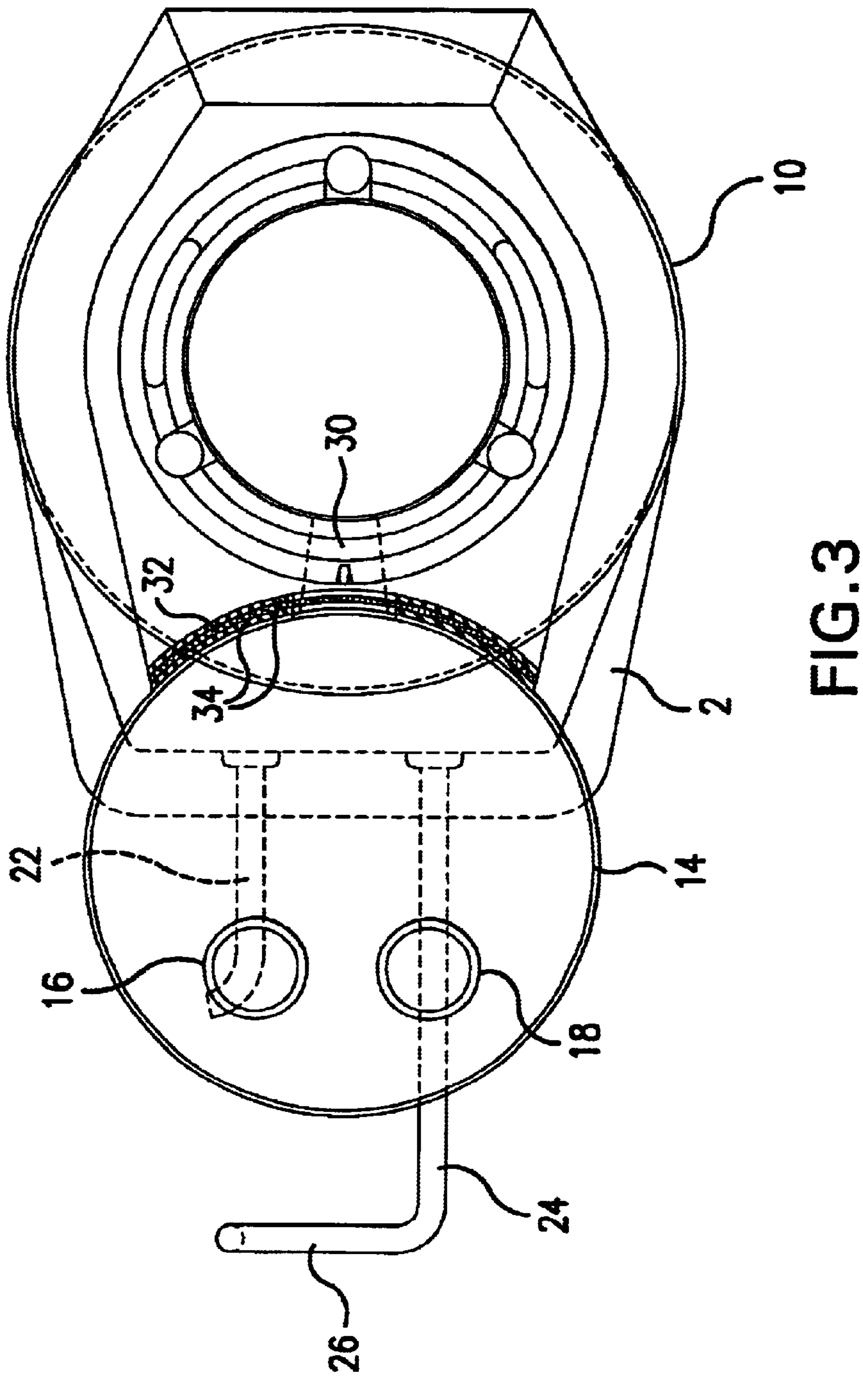
FIG. 3 is a plan view thereof.
Figure 5:
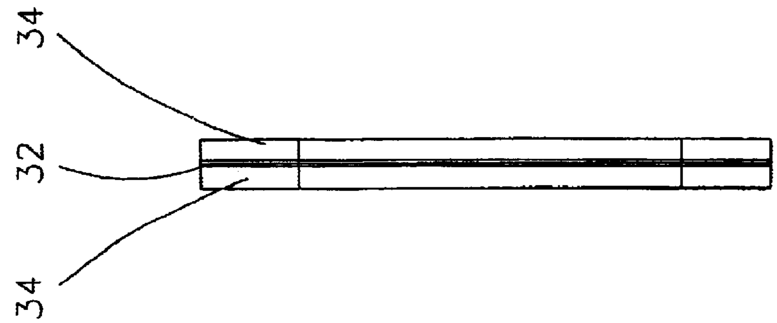
FIG. 5 is a cross-section therethrough.
Figure 4:
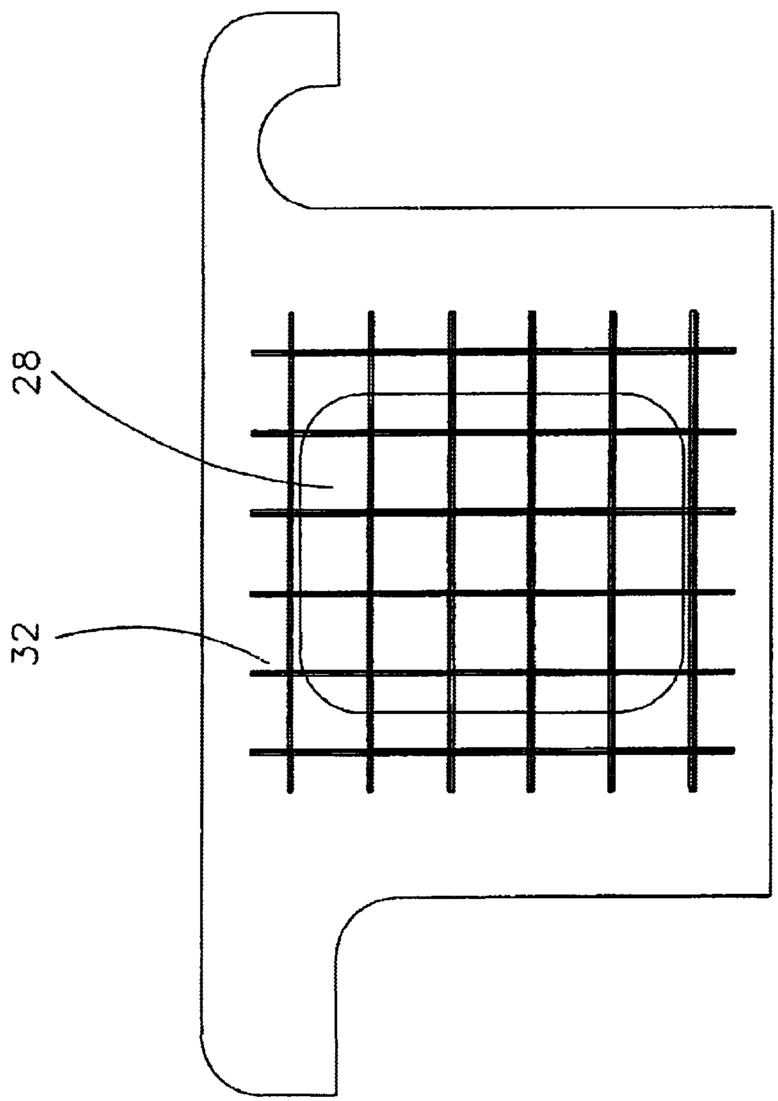
FIG. 4 is a detailed view of the electro-welded grid.

As can be seen from the figures, the coffee grinder-dispenser according to the invention comprises substantially a base structure 2 housing an electric motor 4, on the shaft 6 of which the grinding device indicated overall by 8 is fixed. A cup member of transparent plastic 10 provided with a closure gate 12 is secured to the base structure.

A funnel 14 is connected to base structure 2. Two pushbuttons 16, 18 are provided on the funnel for dispensing a single portion, or a double portion, respectively. The pushbuttons are connected to two multi-rotation potentiometers 20 which enable the portion to be regulated to the extent of about 1 g per 180° rotation.

Two metal rods 22, 24 shaped to together form a support for the filter holder are also rigid with the base structure 2. In detail, the two rods both present a first parallel portion for engaging the neck of the filter holder, the second rod 24 presenting a semi-circumferential portion 26 on which the handle of the filter holder rests.

In correspondence with the entry hole 28 of the funnel 14 facing the distribution conduit 30 positioned downstream of the grinding device 8 there is applied an electro-welded grid 32 of stainless steel. The wire of the grid preferably has a cross-sectional dimension less than 0.6 mm and forms a mesh of aperture size 5–7 mm. The electro-welded grid 32 is interposed between two plastic gaskets 34.

The operation of the grinder-dispenser is traditional so that, when one of the two pushbuttons 16, 18 has been pushed to choose the required portion size, the motor 4 is operated to grind a predetermined quantity of coffee which is fed into the funnel 14 to then fall into the filter holder resting on the support device.

Because of the presence of the grid 32, the speed with which the coffee emerges is reduced such that it does not adhere to the funnel walls and can therefore fall into the filter holder.

Other refinements will occur to the skilled artisan in the pertinent technology. Consequently, the appended claims should be broadly construed, in conformance with the invention, and should not be limited to their literal terms.

What is claimed is:

1. A combined coffee grinder and dispenser comprising:

a) a base, b) a vertically oriented receptacle secured to the top of said base for receiving coffee beans, c) a grinder disposed within said base for grinding the coffee beans into a powder, d) an electric motor disposed within said base for driving said grinder, e) a vertically oriented dispensing funnel with a curved upper end secured to the exterior of said base at a position below said receptacle, f) an entry port in said funnel for receiving ground coffee in powder form, g) a distribution conduit extending horizontally between said grinder and said entry port in said funnel, h) the invention being characterized by a grid situated between said distribution channel and said entry port in said funnel, said grid being secured within said entry port of said funnel, i) said grid being concave in shape, the concavity following the curved shape of the upper end of said funnel and projecting into said distribution channel, j) said grid reducing the velocity of the powder exiting the distribution channel and passing into said entry port, so that the coffee powder flows freely through said entry port into said funnel.

2. The coffee grinder-dispenser of claim 1 further characterized in that said grid is formed of a first plurality of horizontally extending rods and a second plurality of vertically extending rods, said rods intersecting at right angles and being spaced apart by 5 to 7 mm.

3. The coffee grinder-dispenser of claim 2 further characterized in that said grid is interposed between two plastic gaskets.

* * * * *